US012595058B2

(12) United States Patent
Amstutz et al.

(10) Patent No.: US 12,595,058 B2
(45) Date of Patent: Apr. 7, 2026

(54) AIRCRAFT GALLEY MOVEABLE COUNTERTOP

(71) Applicant: Airbus Operations GmbH, Hamburg (DE)

(72) Inventors: Stefan Amstutz, Hamburg (DE); Kathrin Thielbeer, Hamburg (DE); Patrick Timke, Hamburg (DE); Tobias Dahms, Hamburg (DE); Jessica Kropp, Hamburg (DE); Christian Schüßeler, Hamburg (DE); Robert Kirsten, Hamburg (DE); Stephan Schniegler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/738,502

(22) Filed: Jun. 10, 2024

(65) Prior Publication Data

US 2024/0409215 A1 Dec. 12, 2024

(30) Foreign Application Priority Data

Jun. 9, 2023 (DE) .......................... 102023115156.8

(51) Int. Cl.
B64D 11/04 (2006.01)
(52) U.S. Cl.
CPC .................................. B64D 11/04 (2013.01)
(58) Field of Classification Search
CPC ..... B64D 11/04; B64D 11/0007; A47B 31/06; A47B 83/045
See application file for complete search history.

(56) References Cited

U.S. PATENT DOCUMENTS

| | | | | |
|---|---|---|---|---|
| 8,944,376 | B2 * | 2/2015 | Godecker | .......... B64D 11/0007 244/118.5 |
| 9,352,838 | B2 * | 5/2016 | Godecker | .......... B64D 11/0007 |
| 11,021,254 | B2 * | 6/2021 | Swanson | ................ B64D 11/04 |
| 11,465,748 | B2 * | 10/2022 | Bauer | ...................... B64D 11/04 |
| 12,110,112 | B2 * | 10/2024 | Barmichev | ............ B64D 11/04 |
| 2012/0285335 | A1 * | 11/2012 | Cunningham | ......... B64D 11/04 99/323.1 |
| 2013/0187000 | A1 * | 7/2013 | Godecker | .............. B64D 11/04 244/118.5 |
| 2015/0122946 | A1 * | 5/2015 | Godecker | .......... B64D 11/0007 244/118.5 |
| 2018/0162532 | A1 * | 6/2018 | Swanson | ................ B64D 11/04 |
| 2021/0061470 | A1 | 3/2021 | Burd et al. | |
| 2022/0380052 | A1 * | 12/2022 | Barmichev | ........ B64D 11/0007 |

* cited by examiner

*Primary Examiner* — Philip J Bonzell
(74) *Attorney, Agent, or Firm* — Greer, Burns & Crain, Ltd.

(57) ABSTRACT

The present disclosure relates to an aircraft galley. In order to provide an aircraft galley with improvements for operation and ergonomics, a galley module for an aircraft is provided that comprises a galley support structure providing a plurality of storage compartments and a countertop arranged above lower storage compartments and below upper storage compartments. The countertop is provided as permanent working surface for onboard services. At least one portion of the countertop is an extendable countertop portion that is movable between a retracted position and an extended position.

18 Claims, 16 Drawing Sheets

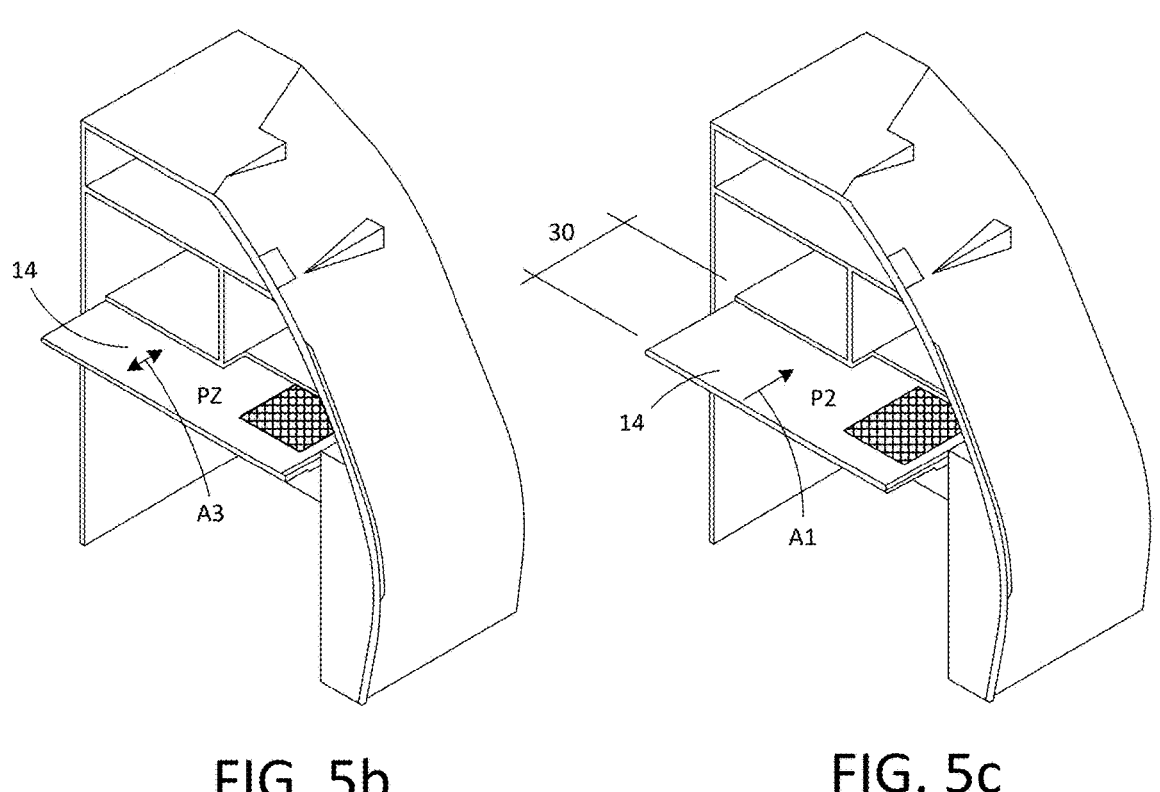
FIG. 5b                                    FIG. 5c
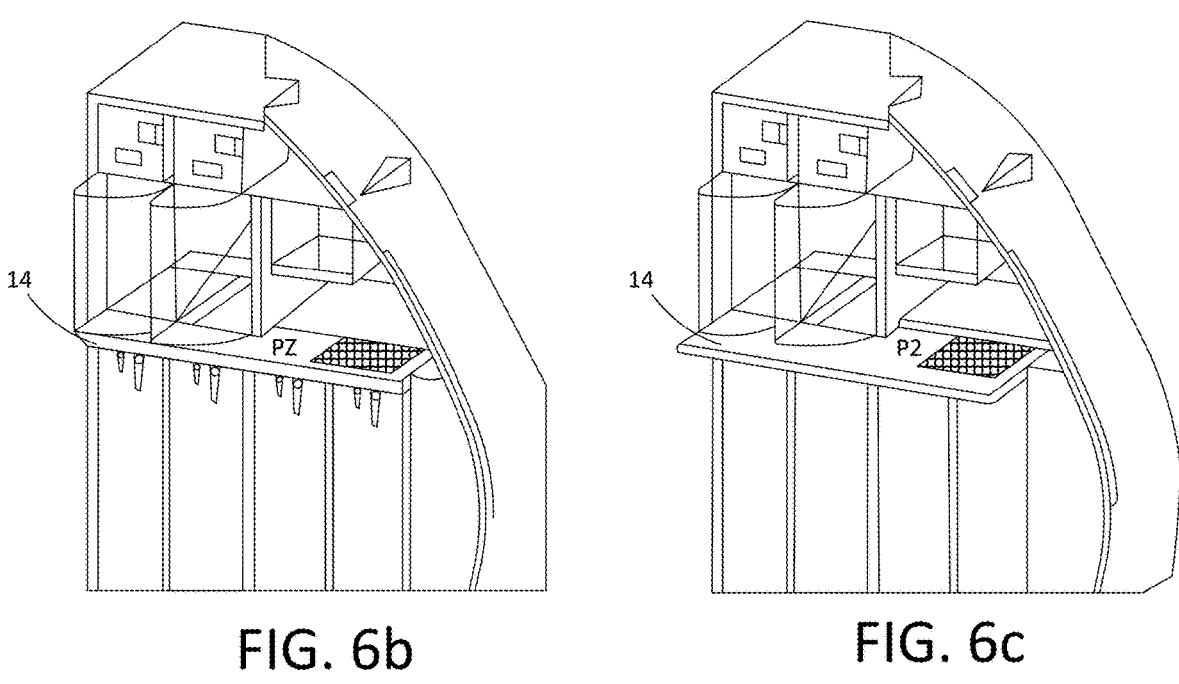
FIG. 6b                                    FIG. 6c

AIRCRAFT GALLEY MOVEABLE COUNTERTOP

CROSS-REFERENCES TO RELATED APPLICATIONS

This application claims the benefit of the German Patent Application No. 102023115156.8 filed on Jun. 9, 2023, the entire disclosures of which are incorporated herein by way of reference.

FIELD OF THE INVENTION

The present invention relates to a galley module for an aircraft, to an aircraft galley for a passenger airplane, to an aircraft and to a method for operating a galley onboard an aircraft.

BACKGROUND OF THE INVENTION

For the operation of a passenger aircraft, service areas are provided within the cabin space that allow the storing and preparation of food and beverages for onboard catering services. These service areas are provided by so-called galleys, which may provide space for stowage containers for beverages and food and which galleys are equipped for serving meals and drinks. Besides storing, galleys may also provide equipment for heating meals or preparing drinks like coffee machines or dispensing units for soft drinks.

During a catering process in an aircraft galley, different working space may be desired. As an example, US 2021/0061470 A1 describes a stowable door folding table. However, it has been shown that despite additional workspace, operation challenges for the crew members may occur. Further, space restrictions due to the regime of an economic use of the available space in the galleys may be cumbersome also in an ergonomic sense. The additional space may be too limited, and complex moving mechanism are prone to malfunctioning.

SUMMARY OF THE INVENTION

It is therefore an object of the present disclosure to provide an aircraft galley with improvements for operation and ergonomics.

The object of the present invention is solved by the subject-matter of the independent claims; further embodiments are incorporated in the dependent claims. It should be noted that the following described aspects of the invention apply also for the galley module for an aircraft, for the aircraft galley for a passenger airplane, for the aircraft and for the method for operating a galley onboard an aircraft.

According to the present invention, a galley module for an aircraft is provided. The galley module comprises a galley support structure providing a plurality of storage compartments and a countertop arranged above lower storage compartments and below upper storage compartments. The countertop is provided as permanent working surface for onboard services. At least one portion of the countertop is an extendable countertop portion that is movable between a retracted position and an extended position.

As an effect, additional working space is provided in a facilitated manner during flight phases when e.g. on-board services take place.

As a result, more working space is provided, e.g., up to 40% plus. In an example, up to 100% additional workspace is provided. For example, in a retracted position, a depth of e.g., 300 mm is provided and in a fully extended state, a work surface depth of e.g., 600 mm is achievable.

As a benefit, a seamless adjustment of the working surface area is provided.

The present invention addresses challenges during a catering process in an aircraft galley in form of i) operation: not enough space in galleys; and ii) ergonomics: size practicality, i.e., that they are reliably working.

Another advantage are better ergonomics for the staff members, i.e., the cabin crew members.

According to an example, in the retracted position, a part of the extendable countertop portion is exposed as a basic working surface, and in the extended position, the complete extendable countertop portion is exposed as an enlarged working surface.

According to an example, an extension ratio of the enlarged working surface in relation to the basic working surface of approximately 2:1 is provided.

According to an example, the extendable countertop portion provides a continuous working surface portion in the retracted position as well as in the extended position.

According to an example, the extendable countertop portion is having a continuous width of at least one of the group of:

i) at least two upper storage compartments; and ii) at least two lower storage compartments.

According to an example, the extendable countertop portion comprises a plate structure mounted on at least two sliding rails.

According to an example, at least one latching system is provided configured to temporarily fix the extendable countertop portion in at least the retracted position and the extended position.

According to an example, at least one extendable countertop portion comprises a drainage section that comprises a drainage grill as an upper resting surface and a liquid collecting arrangement below the drainage grill. Further, a liquid drainage function of the drainage section is provided at least for the retracted position and the extended position.

As an advantage, a bigger sink is provided, i.e. a part of the working surface that is provided with a sink-functionality.

According to an example, the liquid collecting arrangement comprises an inclined liquid collecting trough below the drainage grill. Further, the liquid collecting trough has a lower discharge outlet. Still further, a collecting trench is arranged below the lower discharge outlet to receive the discharged liquid. Furthermore, the collecting trench is configured to be connected to an aircraft wastewater duct arrangement to transfer the discharged liquid to the aircraft wastewater duct arrangement.

As an option, the collecting trench spans in a moving direction of the movable countertop such that the lower discharge outlet is permanently arranged above the collecting trench.

In an option, an aircraft galley is provided that comprises a housing structure and a movable countertop. The aircraft galley is provided especially for a use in an aircraft passenger cabin.

In an option, at least one sliding rail is arranged on the galley, and the at least one sliding rail is configured to move the countertop.

In an option, a drainage grill is integrated in the movable countertop.

According to the present invention, also an aircraft galley for a passenger airplane is provided. The galley comprises a galley module according to one of the preceding examples and a plurality of trolleys and standard units storable in the storage compartments. During at least one of the group of loading operation, on-board service operation during flight and unloading operation, the extendable countertop portion is movable into the extended position.

According to the present invention, also an aircraft is provided. The aircraft comprises a fuselage structure and a cabin space accommodated inside the fuselage structure. The cabin space comprises at least one galley module according to one of the preceding examples or at least one aircraft galley according to the preceding example.

According to the present invention, also a method for operating a galley onboard an aircraft is provided. The method comprises the following steps:

providing a galley module with galley support structure comprising a plurality of storage compartments; and with a countertop arranged above lower storage compartments and below upper storage compartments; the countertop is provided as permanent working surface for onboard services; and moving at least one extendable countertop portion of the countertop from a retracted position to an extended position or vice versa.

The present invention is directed to an aircraft galley, especially for a use in an aircraft passenger cabin.

The invention finds use in the field of aircraft galleys.

According to an aspect, the present invention is directed to an aircraft galley, especially for a use in an aircraft passenger cabin. The invention finds use in the field of aircraft galleys.

According to an aspect, a working deck is provided that can be pulled-out to provide a larger working area and that can be partly pushed back into a receptacle to provide a smaller working area for gaining more space in front of the galley, e.g., as required for evacuation.

According to an aspect, a movable working deck is provided that is always present and ready for use for at least smaller size. The workdeck as presented to the user is continuous in its surface regarding the movement direction.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 5b shows the galley module of FIG. 5a with the movable countertop in a state of motion between the retracted and the extended position. FIG. 5c shows the

Figure 5A:
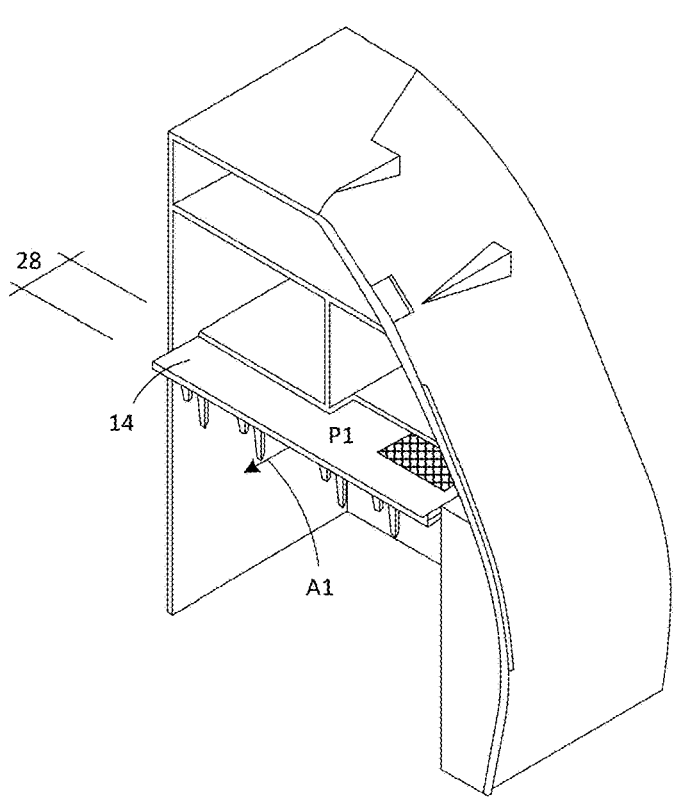
FIG. 5a shows the galley module of FIG. 3 in a further perspective view with the movable countertop in the retracted position.

4 galley module of FIG. 5a and FIG. 5b with the movable countertop in the extended position.

Figure 3:
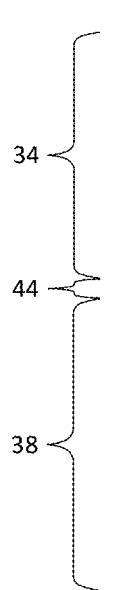
FIG. 3 shows a front view of the example of FIG. 1a and FIG. 1b.
Figure 3:
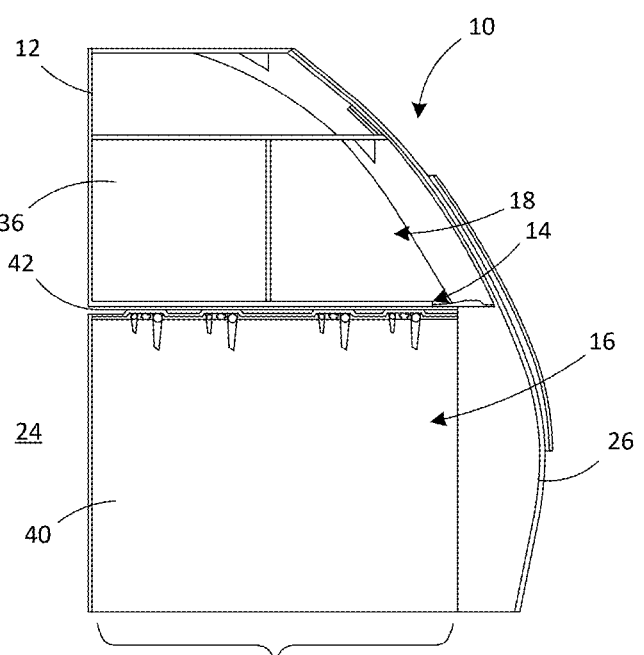
Figure 6A:
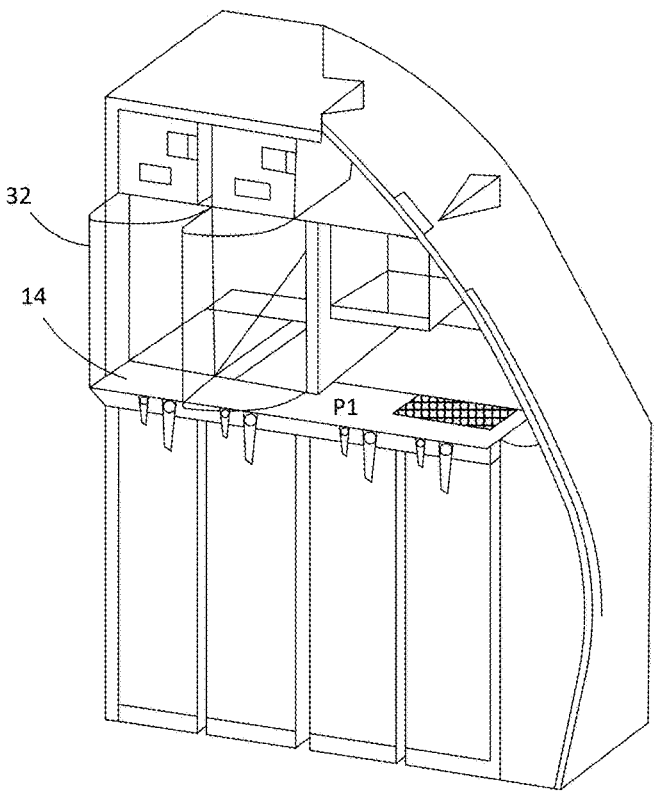

FIG. 6a shows the aircraft galley of FIG. 3 in a further perspective view with the movable countertop in the retracted position. FIG. 6b shows the aircraft galley of FIG. 6a with the movable countertop in a state of motion between the retracted and the extended position. FIG. 6c shows the aircraft galley of FIG. 6a and FIG. 6b with the movable countertop in the extended position.

Figure 7A:
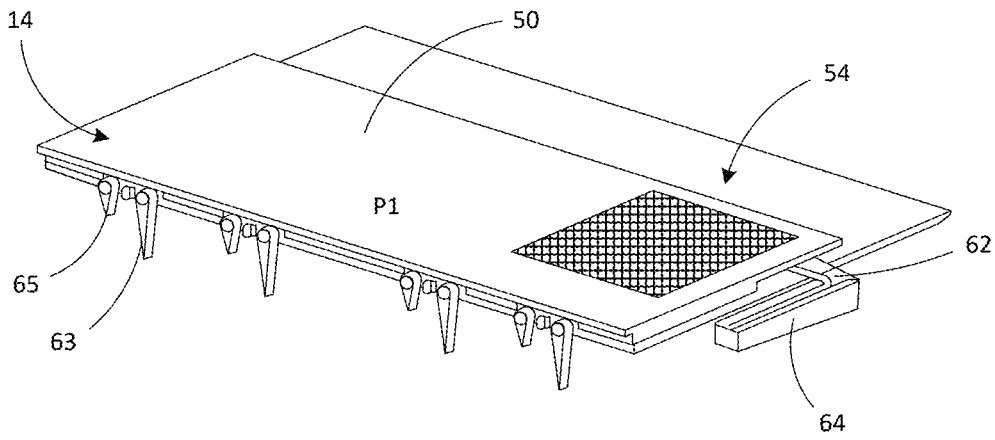
Figure 7B:
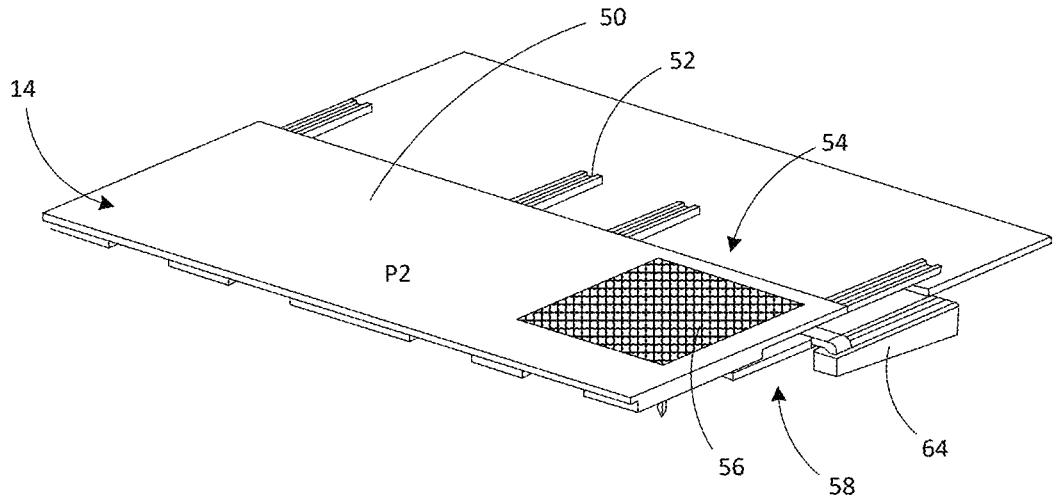

FIG. 7a shows an example of an extendable countertop spanning across the width of the galley. The countertop is shown in its retracted position. FIG. 7b shows the example of FIG. 7a with the countertop in its extended position.

Figure 8:
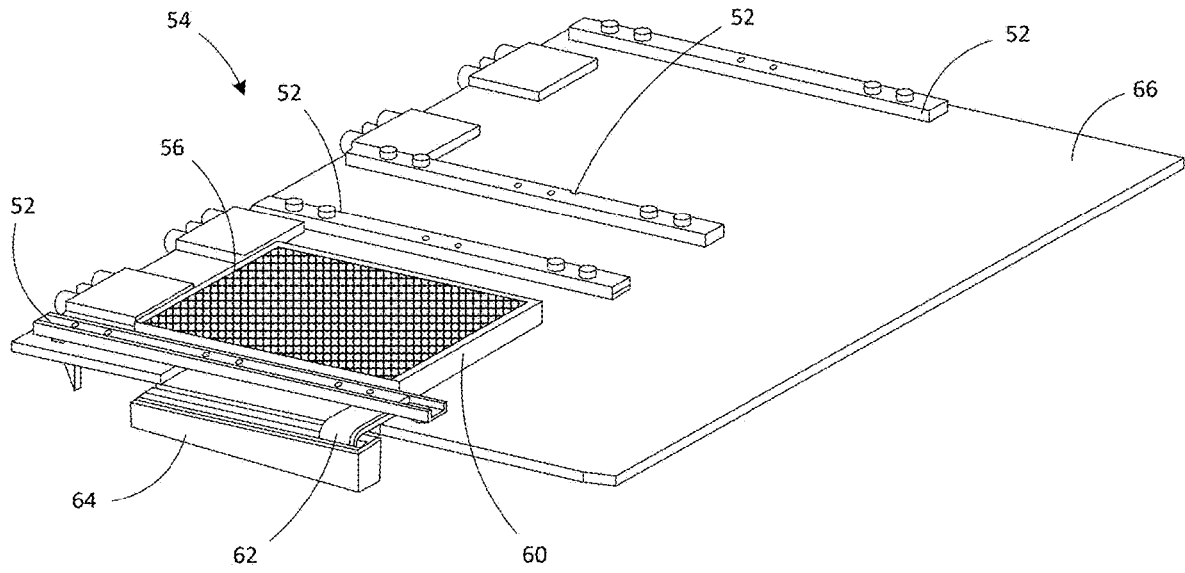

FIG. 8 shows a perspective view of the example of FIG. 7b in another viewing direction, with partly not shown parts for better illustrating a liquid collecting arrangement providing a sink-like function.

Figure 9A:
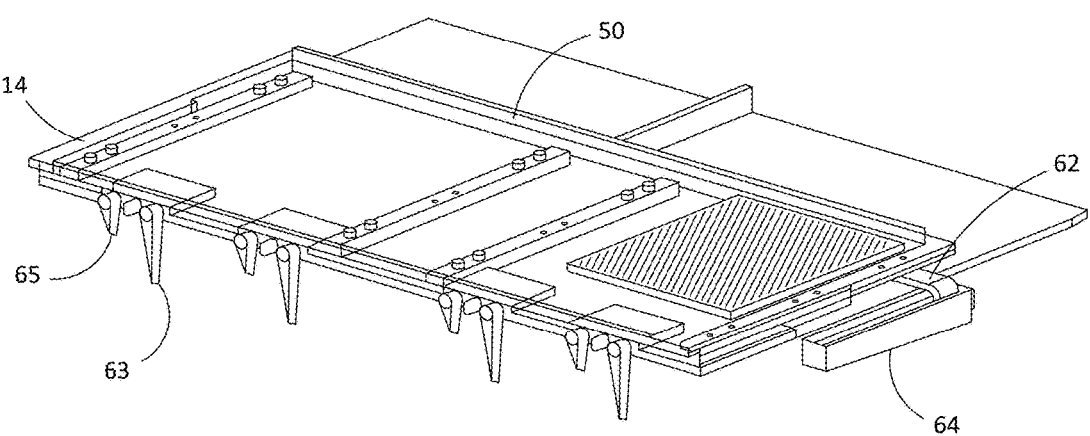
Figure 9B:
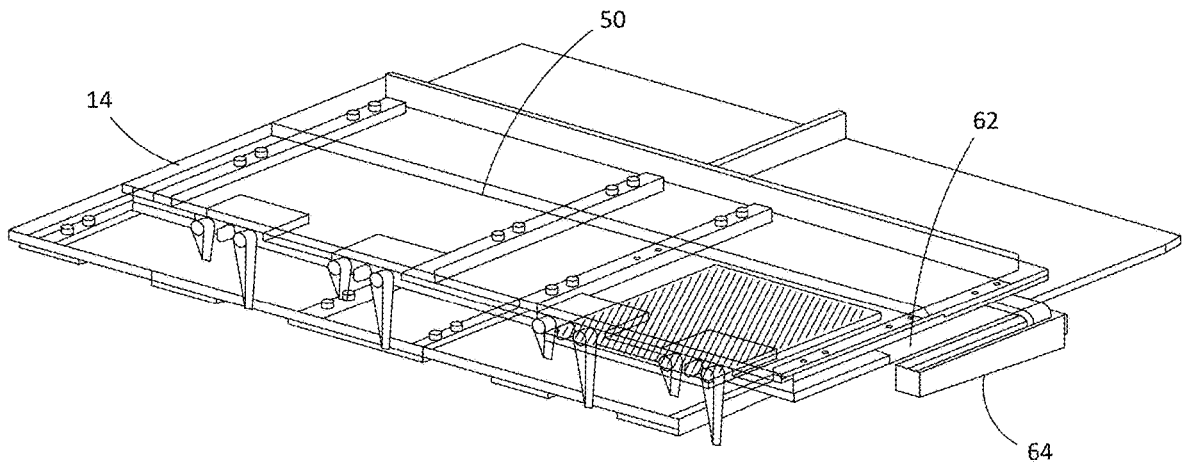

FIG. 9a shows another perspective view of the extendable countertop in its retracted position. FIG. 9b shows the example of FIG. 9a with the countertop in its extended position.

Figure 1A:
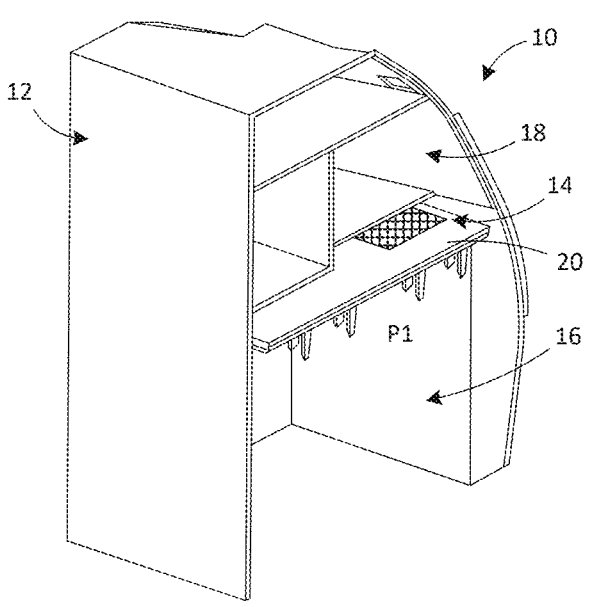
FIG. 1a schematically shows a perspective view of an example of a galley module for an aircraft with a movable countertop in a retracted position.
Figure 10A:
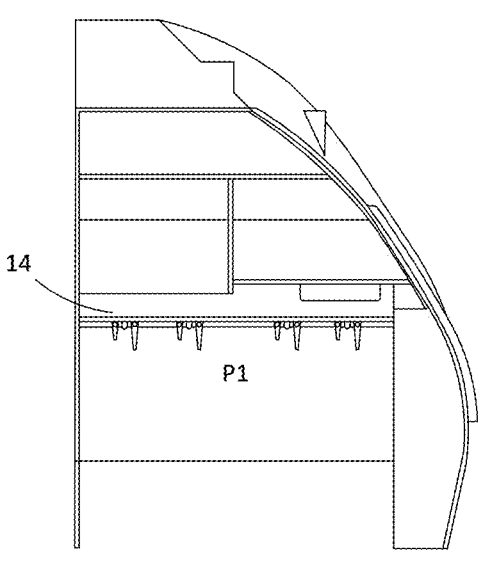
Figure 10B:
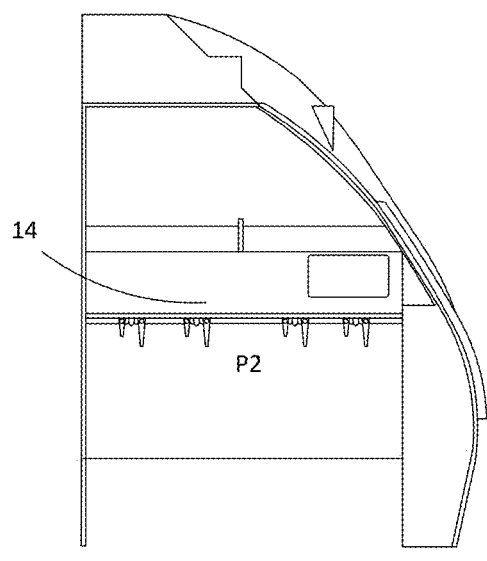

FIG. 10a shows another perspective front view of the example of FIG. 1a with the extendable countertop in its retracted position. FIG. 10b shows the example of FIG. 10a with the countertop in its extended position.

Figure 11:
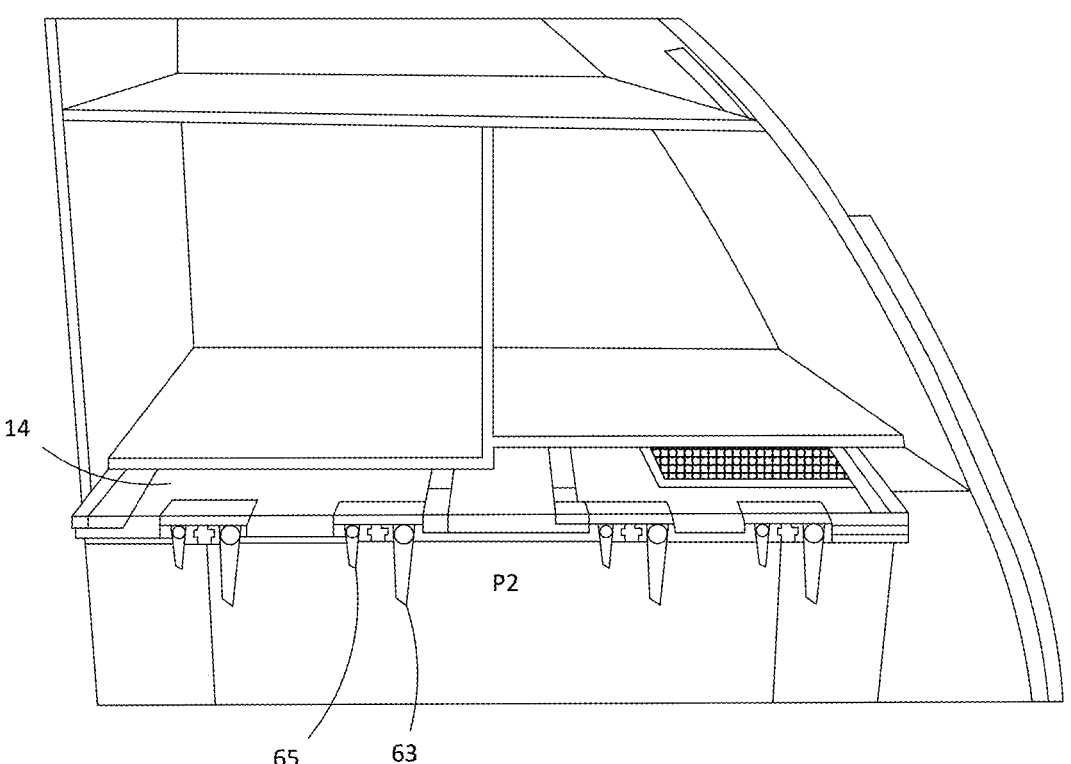

FIG. 11 shows a further perspective view of an example of a galley module with an extendable countertop and an integrated liquid collecting arrangement.

Figure 12A:
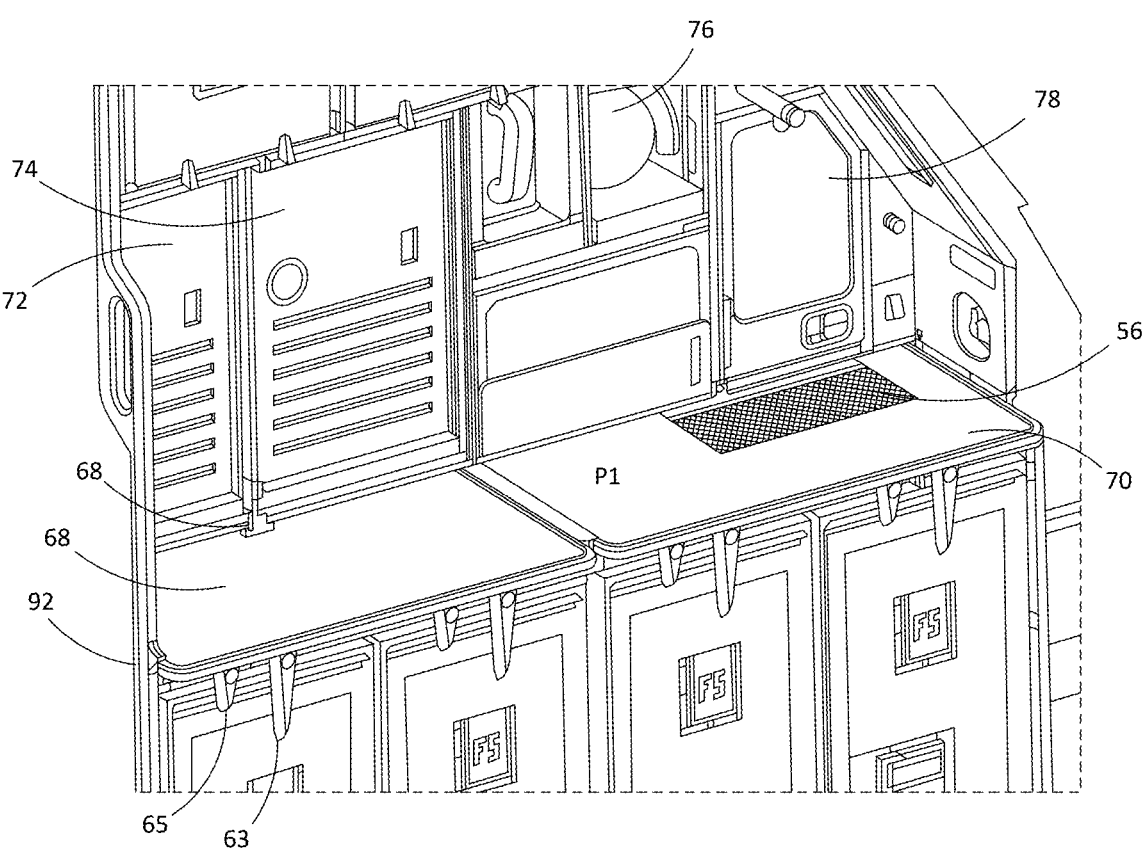
Figure 12B:
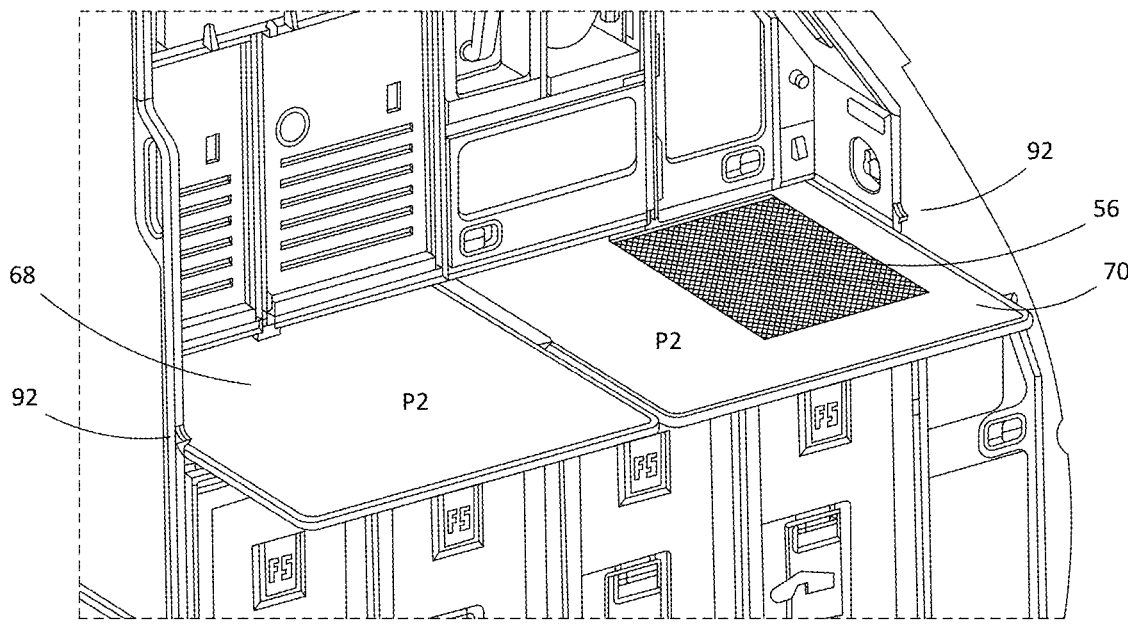

FIG. 12a shows a further example of a galley module with an extendable countertop that is provided as two separate portions. The left portion and the right portion both provide an extendable working surface portion; the right is also equipped with an integrated liquid collecting arrangement. The countertop is shown in its retracted position. FIG. 12b shows the example of FIG. 12a with the countertop in its extended position.

Figure 13:
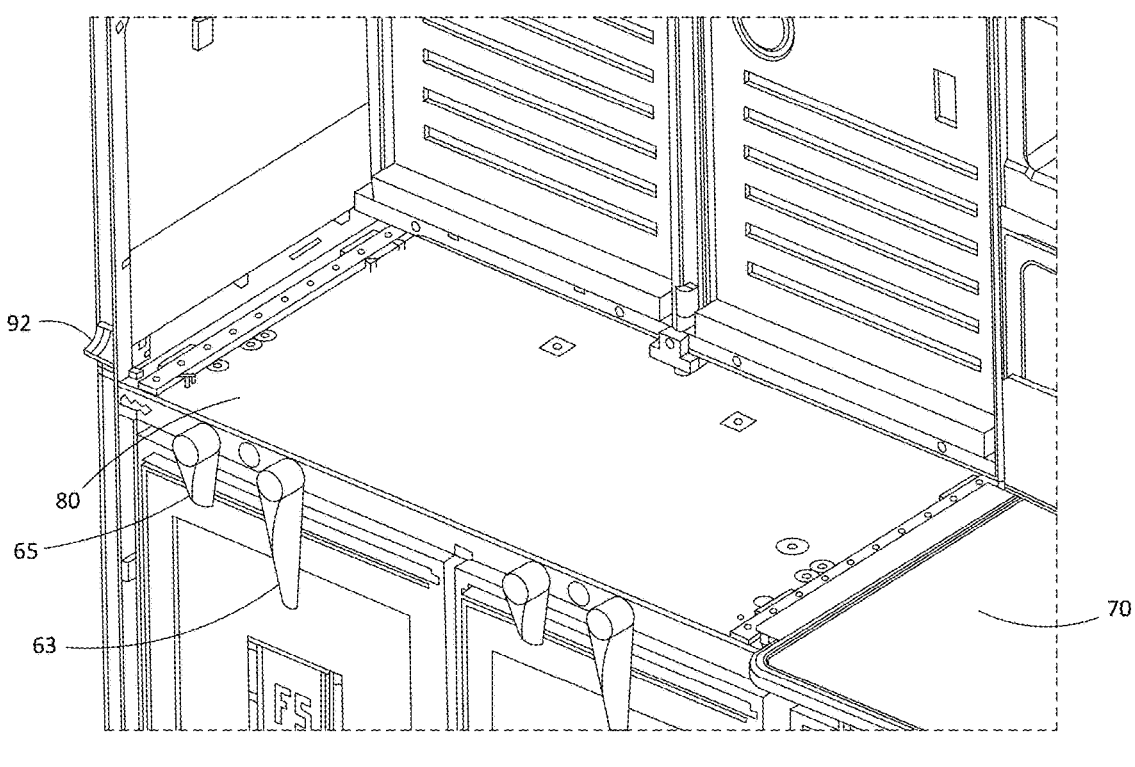

FIG. 13 shows a further perspective view of the left portion of FIG. 12 without an upper plate of the movable countertop.

Figure 14A:
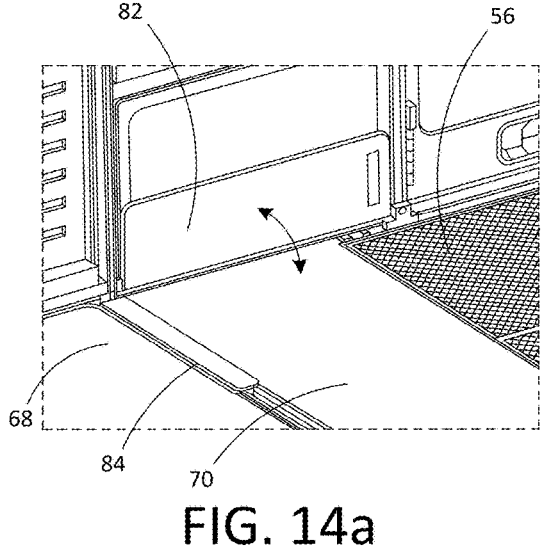
Figure 14B:
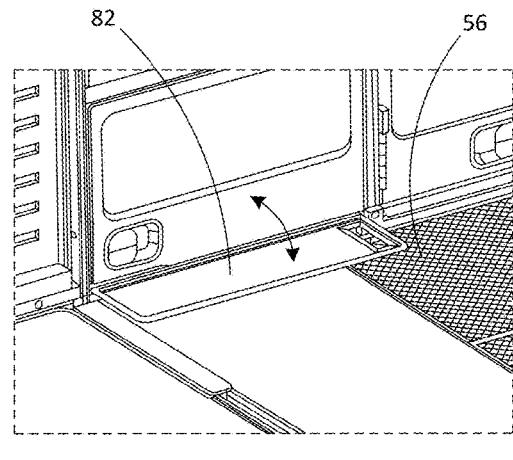

FIG. 14a shows a section of the right portion of FIG. 12 with a foldable tray providing a bridging function to the integrated liquid collecting arrangement on the ride side. FIG. 14a shows the tray in an upright manner, i.e., in a parking or storage position. FIG. 14b shows the tray pivoted downwards to the horizontal, i.e., in a collecting or use position.

Figure 15A:
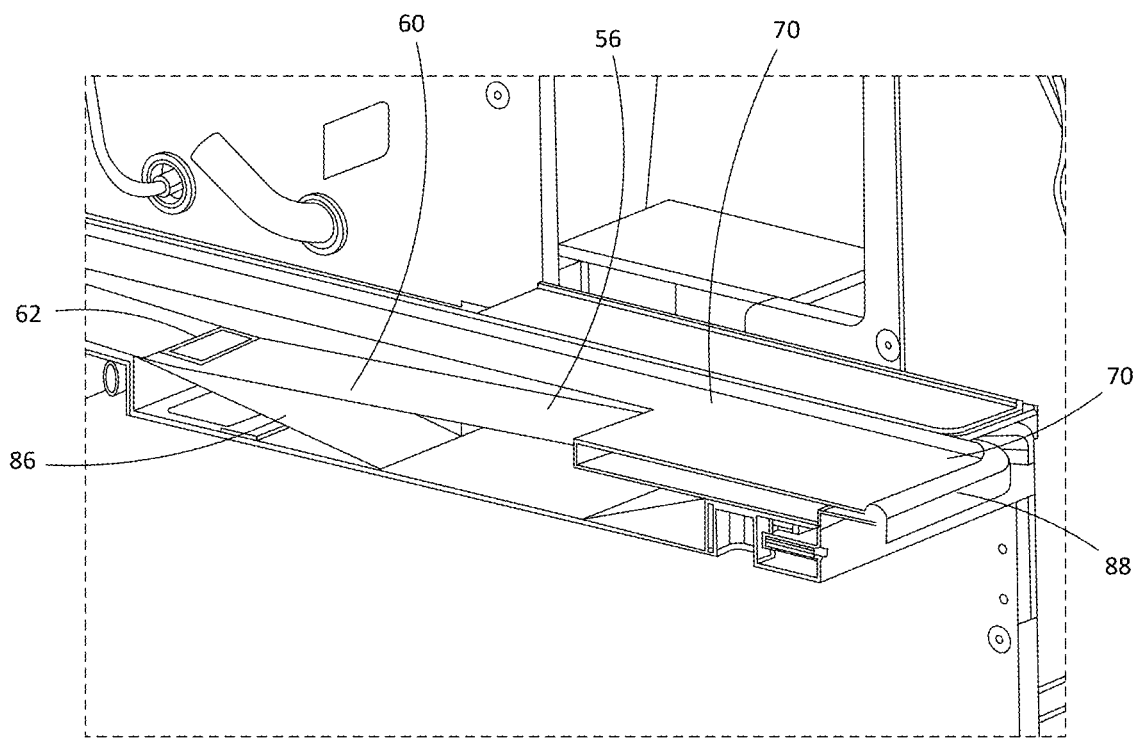
Figure 15B:
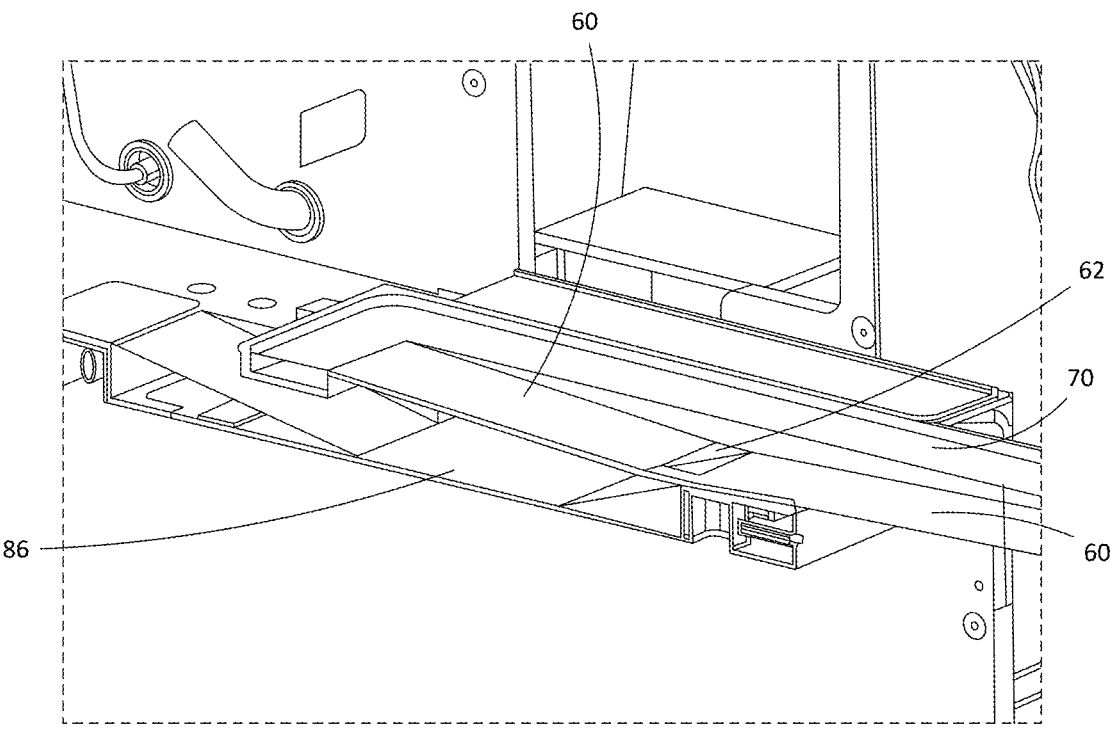

FIG. 15a shows a perspective cross-section through the integrated liquid collecting arrangement when the countertop is in its retracted position. FIG. 15b shows the countertop is in its extended position.

Figure 16A:
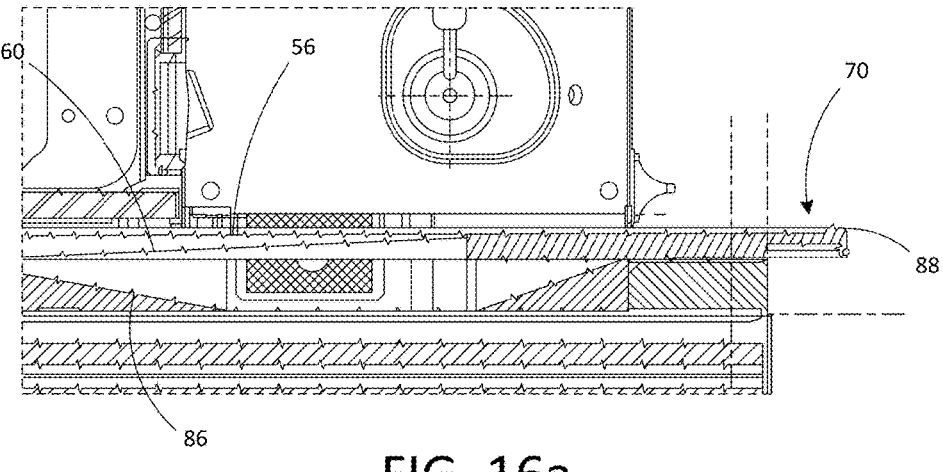
Figure 16B:
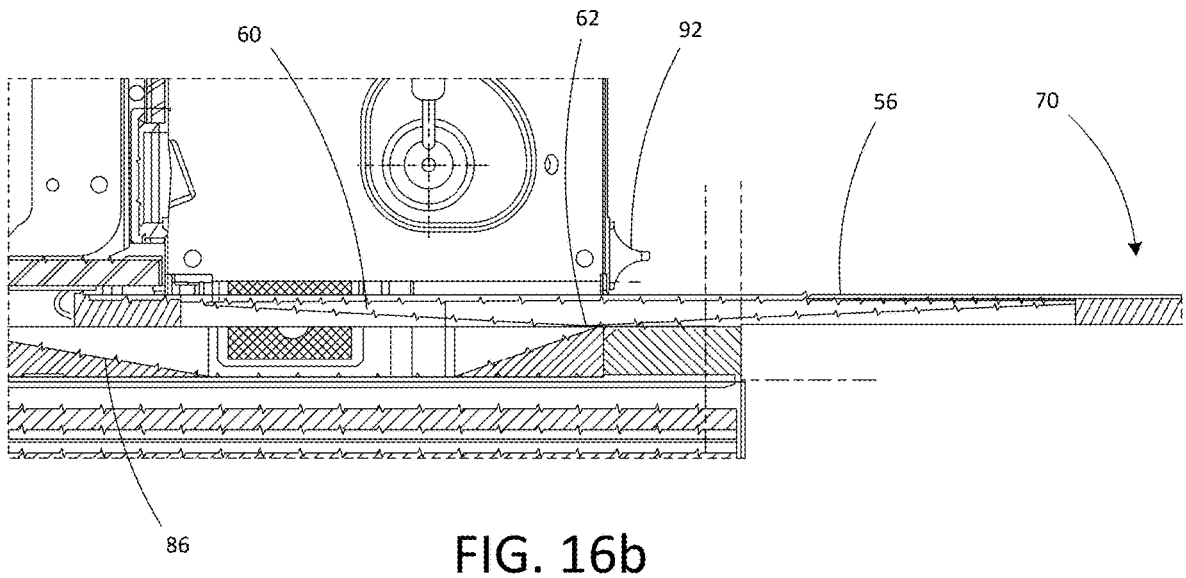

FIG. 16a shows a cross-section through the integrated liquid collecting arrangement when the countertop is in its retracted position. FIG. 16b shows the countertop is in its extended position.

Figure 17:
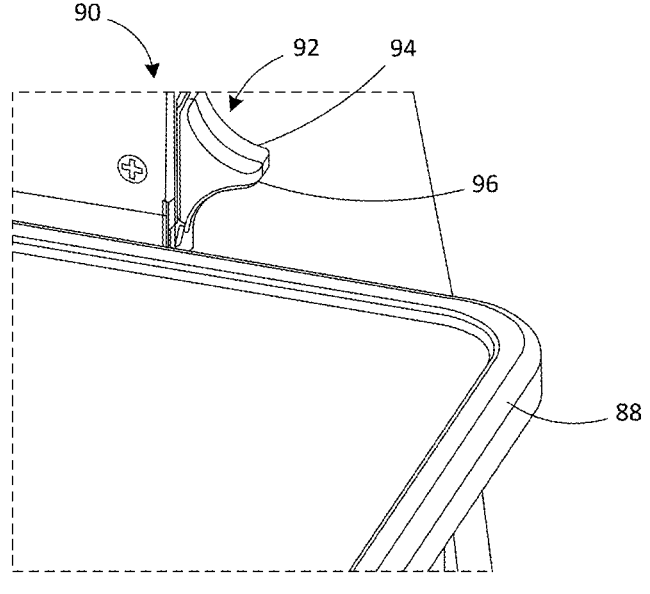

FIG. 17 shows a spilling edge as a detail of the countertop in a perspective view.

Figure 18:
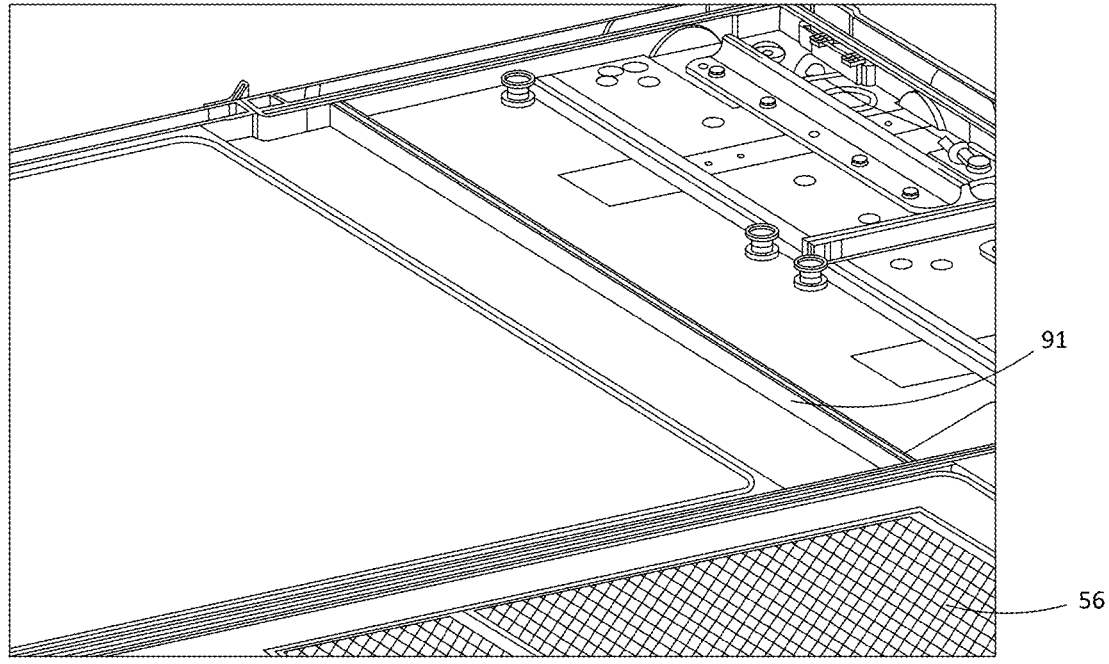

FIG. 18 shows a perspective view of a rail and a barrier below the upper plate of the movable countertop.

Figure 19:
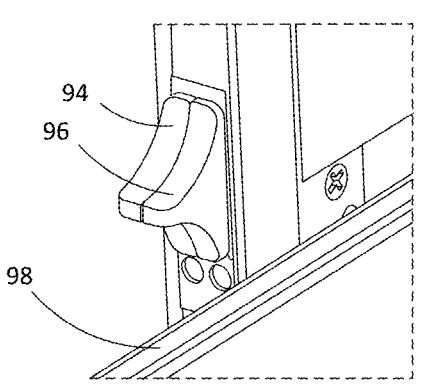

FIG. 19 shows an example of a double latch for releasably holding the countertop.

Figure 20:
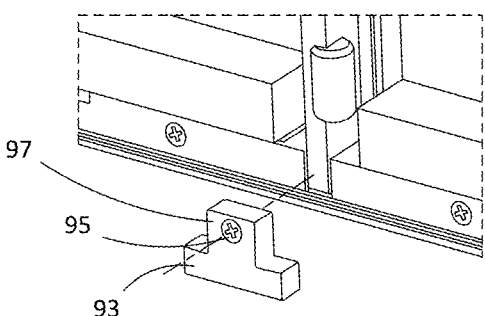

FIG. 20 shows an example of a removable stop for the countertop.

Figure 21:
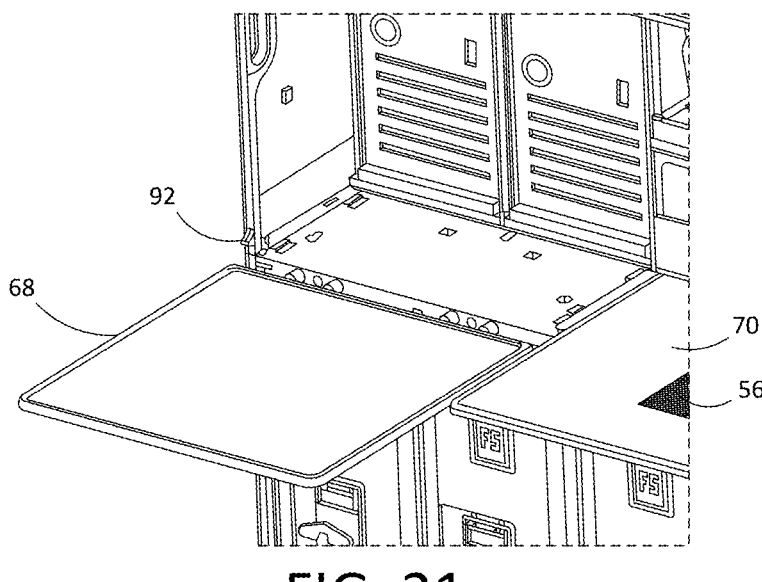

FIG. 21 shows a perspective view of the example of FIG. 13 with the right countertop in its retracted position and the left countertop in a released or demounted state when a stop has been removed.

Figure 22:
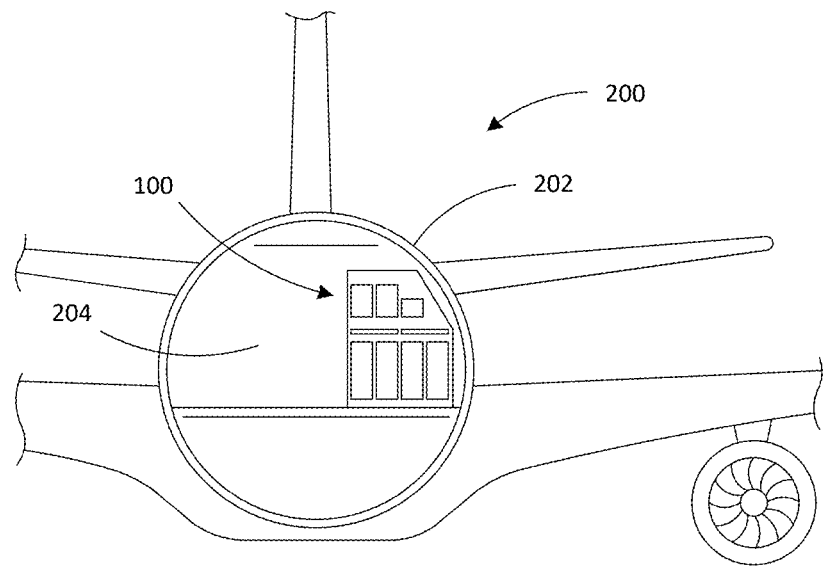

FIG. 22 shows an example of an aircraft in a cross-section.

Figure 23:
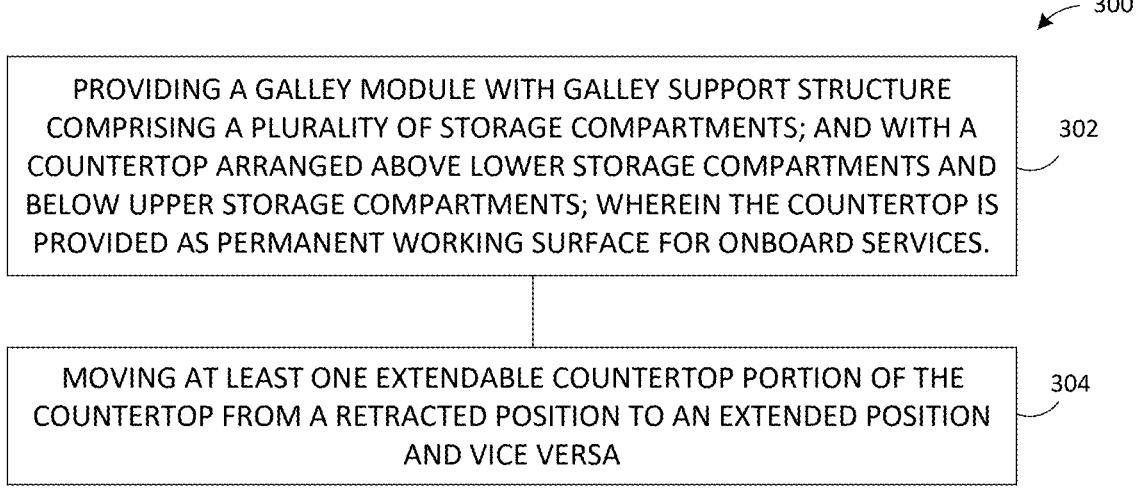

FIG. 23 shows basic steps of an example of a method for operating a galley onboard an aircraft.

DETAILED DESCRIPTION OF THE PREFERRED EMBODIMENTS

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

Figure 1B:
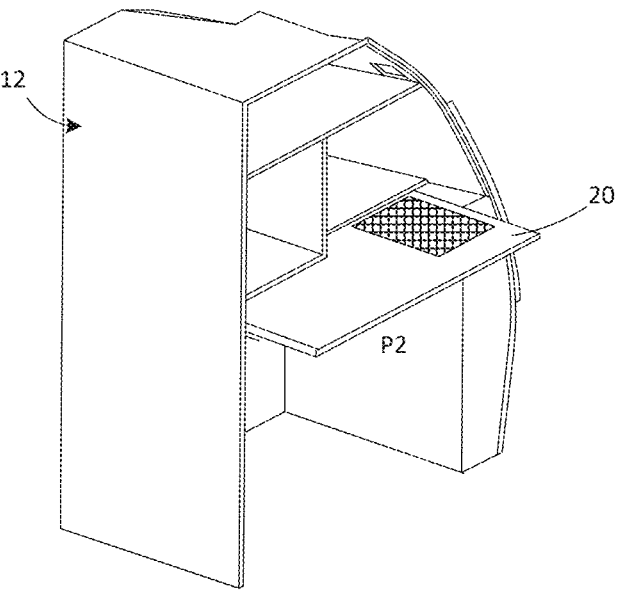
FIG. 1b shows the galley module of FIG. 1a with the movable countertop in an extended position.

In FIG. 1*a*, a perspective view of an example of a galley module 10 for an aircraft is shown. The galley module 10 comprises a galley support structure 12 providing a plurality of storage compartments. The galley module 10 also comprises a countertop 14 arranged above lower storage compartments 16 and below upper storage compartments 18. The countertop 14 is provided as permanent working surface for onboard services. At least one portion of the countertop 14 is an extendable countertop portion 20 that is movable between a retracted position P1 and an extended position P2. FIG. 1*a* shows the movable countertop 14 in the retracted position P1. In FIG. 1*b*, the movable countertop 14 is shown in the extended position P2.

The term "galley support structure" relates to e.g. vertical and horizontal parts of the galley that provide stability and load transfer, for example for items and equipment to be provided or contained by the galley. The galley support structure 12 comprises e.g., outer and inner side walls, partition or separation walls, horizontal dividing panels, closing rear panels and the like. The galley support structure 12 may comprise panels, beams, frames, or other support structures.

The term "countertop" relates to a working surface arranged in a height such that a standing crew member of the aircraft can prepare e.g., beverages or food in a convenient and ergonomically useful height. The countertop can also be referred to as work surface, working surface, worktop, or workspace.

The term "permanent working surface" relates to a working surface that is always present and usable as such.

The term "extendable countertop portion" relates to a portion of the countertop that can be extended, e.g., pulled out or extracted. The portion can be a part, e.g., half of the working surface, or less or more, but can also be the complete working surface.

The term "retracted position" relates to a position of the movable portion in a so-to-speak minimized state. The retracted position can also be referred to as the minimized or parked position of the working surface. In the retracted position, the movable working surface portion is pushed back into the receiving slot or opening, and only a part of the surface is provided to be used as working surface.

The term "extended position" relates to a position of the movable portion in a so-to-speak maximized state. The extended position can also be referred to as the maximized or extracted position of the working surface. In the extended position, the movable working surface portion is pulled out from the receiving slot or opening, and the complete designated surface is provided to be used as working surface.

In the extended position, a door of a standard unit, e.g., an oven, arranged adjacent the working surface can open into the area of the working surface, while only a part of the working surface area is affected by the opening door such that a distal non-affected working surface part is provided which is large enough to place a beverage container like a can or cup or glass or mug while the door of the standard unit can be operated.

As an option, the upper compartments are rearwardly displaced in relation to the lower compartments. For example, the front faces of standard units stored in the upper compartments are displaced compared to the front faces of trolleys stored in the lower compartments.

In another option, a galley module for an aircraft is provided. The galley module comprises a galley support structure 12 providing a plurality of storage compartments. Further, an extractable countertop is provided arranged above lower storage compartments and below upper storage compartments. The countertop is provided as extendable working surface for onboard services. The countertop is movable between a retracted position and an extended position.

In an option, the countertop is retractable such that a front edge does not protrude from the galley support structure.

In a further option, in the retracted position, the galley module countertop is retractable such that the majority of its upper working surface is arranged within a receptacle provided by the galley support structure. For example, the countertop is completely stored away in the retracted position.

In an option, the countertop is arranged as two or more countertop portions and at least one of the countertop portions is provided with a liquid drainage arrangement, e.g., a sink portion. In the retracted position, the countertop portions, also those with a sink, can be stored away in its full depth.

As an option, the upper compartments are not displaced in relation to the lower compartments. For example, the front faces of standard units stored in the upper compartments are arranged in the same, or nearly same vertical plane, compared to the front faces of trolleys stored in the lower compartments.

Figure 2A:
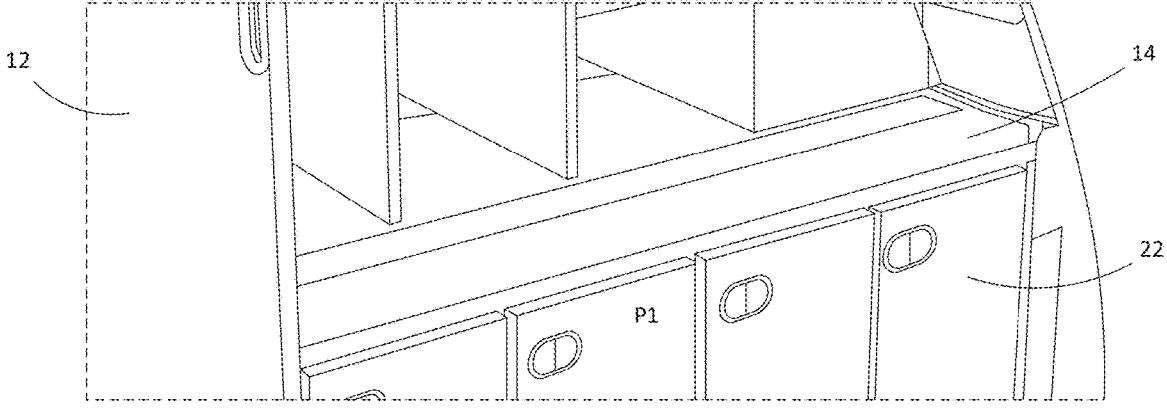
FIG. 2a shows a section of another example of a galley module in a perspective view with a movable countertop in a retracted position.
Figure 2B:
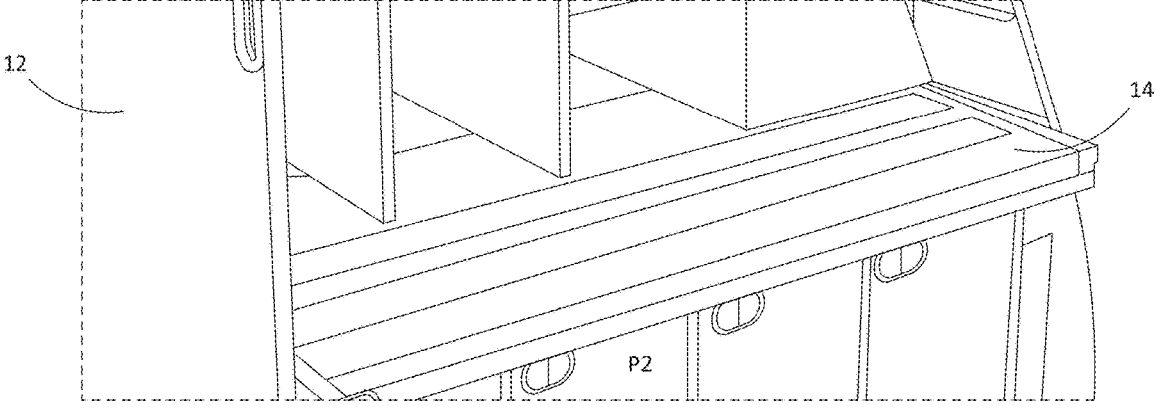
FIG. 2b shows the galley module of FIG. 2a with the movable countertop in an extended position.

In FIG. 2*a*, a section of another example of the galley module 10 is shown in a perspective view with the movable countertop 14 in the retracted position P1. As an example, movable trolleys 22 are parked in the space provided by the lower storage compartments 16. In FIG. 2*b*, the galley module 10 of FIG. 2*a* is shown with the movable countertop 14 in the extended position P2.

FIG. 2*a* and FIG. 2*b* show a schematic drawing of an exemplary embodiment of an aircraft galley with a fully moving countertop that offers more space and an easier operation. The countertop is the workdeck of the galley. As an example, a drainage grill is arranged over the entire width of the work deck. However, other widths are also possible. The drainage grill is integrated in the movable workdeck, with flat drip tray, e.g., a shallow catch basin. The sink, together with system installation, is in the fixed galley part. FIG. 2*a* shows the normal position, i.e., retracted position; FIG. 2*b* shows the expanded state, i.e., pull-out position.

In FIG. 3, a front view of the example of FIG. 1*a* and FIG. 1*b* is shown. As an example, the galley module 10 is configured for use in a single aisle aircraft. For example, an aisle area 24 may be arranged to the left in FIG. 3 and the galley module 10 can be provided with a rounded outer shape 26 to snuggly fit against an inner side of a fuselage enclosing a cabin space in an aircraft.

Figure 4:
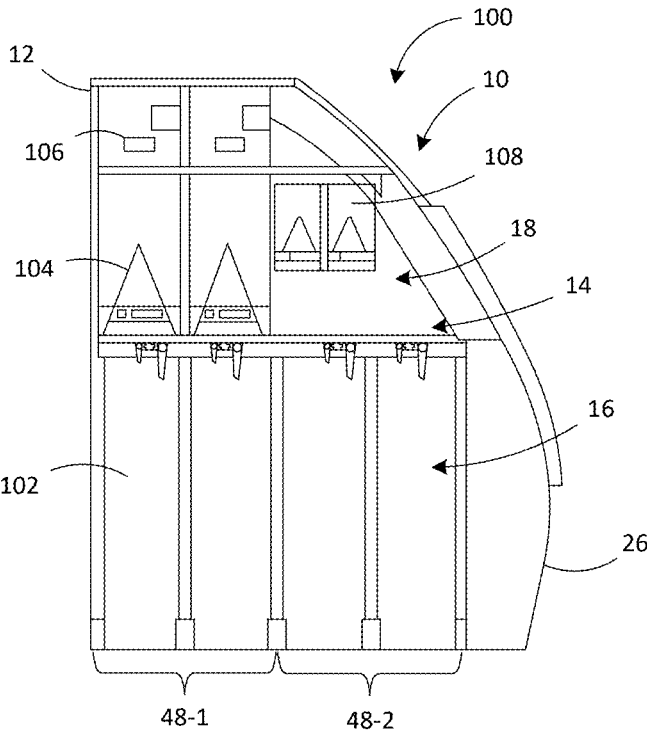
FIG. 4 shows an example of an aircraft galley in a front view.

In FIG. 4, an example of an aircraft galley 100 for a passenger airplane is shown. The galley 100 comprises an example of the galley module 10 according to one of the preceding and following examples. The galley 100 also comprises a plurality of trolleys 102 and standard units 104 storable in the storage compartments. During at least one of the group of loading operation, on-board service operation during flight and unloading operation, the extendable countertop portion is movable into the extended position.

As an example, the trolleys 102 are stored in the lower storage compartments 16 and the standard units 104 are stored in the upper compartments 18. As an example, in addition to the standard units, also further units 106 and equipment 108 can be arranged or installed in the compartments.

The term "trolleys" relates to standard trolleys as commonly used in aircrafts. The trolleys are used e.g., for transport and stowage purposes. The trolleys can be used for loading beverages and food onboard an aircraft. The trolleys can also be used for storing beverages and food onboard an aircraft. The trolleys can also be used for serving beverages and food onboard an aircraft. The trolleys can also be referred to as meal carts or service carts.

The term "standard units" relates to container-like receptacles, i.e., enclosures that are used to load food and beverages and other supply material like cups or napkins on board an aircraft and for storing them in the galley.

In an example, the galley is a single-aisle galley, i.e., a galley that is configured to be used in a single-aisle aircraft. For example, the galley is configured to span crosswise to a direction of travel of the aircraft. As an example, one lateral side of the galley forms a wall facing the aisle and the other lateral side of the galley is configured to snuggly fit against an inner side of the cabin enclosure, e.g., the cabin lining mounted in an inside of a fuselage structure.

In another example, the galley is a dual-aisle galley, i.e., a galley that is configured to be used in a dual-aisle aircraft. For example, the galley is configured to span crosswise to a direction of travel of the aircraft. As an example, one lateral side of the galley forms a wall facing one of the two aisles and the other lateral side forms a wall facing the other of the two aisles.

In a further example, the galley is configured to span parallel to the direction of travel of the aircraft.

In an example, the at least one extendable countertop portion is configured for placing a fully loaded standard unit thereon.

In an example, both extendable countertop portions are each configured for placing a fully loaded standard unit thereon.

In another example, at least one beverage dispensing unit is arranged within the upper part of the galley, i.e., adjacent or above the countertop. In a further example, at least one coffee making unit is arranged within the upper part of the galley, i.e., adjacent or above the countertop. As an example, the at least one oven, beverage dispensing unit or coffee making unit is arranged next to or above the sink portion of the countertop.

In an example, at least one oven is arranged within the upper part of the galley, i.e., adjacent or above the countertop. As an example, at least one oven is arranged laterally displaced to a sink portion of the countertop.

FIG. 4 shows a schematic drawing of a galley, especially an aircraft galley as shown above. This galley is based on current galley design with galley spaces to accommodate transport units or galley devices or so-called GAINs-Galley Insert Equipment. A sliding workdeck is integrated in the same space like the current work decks, meaning the advantage of no loss of space for GAINs and Equipment inside the galley.

According to an option, in the retracted position P1, a part of the extendable countertop portion is exposed as a basic working surface 28, and in the extended position P2, the complete extendable countertop portion is exposed as an enlarged working surface 30.

This is indicated in FIG. 5*a* and FIG. 5*c*. In FIG. 5*a*, the galley module 10 of FIG. 3 is shown with the movable countertop 14 in the retracted position P1. In FIG. 5*b*, the galley module 10 of FIG. 5*a* is shown with the movable countertop 14 in a state of motion between the retracted position P1 and the extended position P2, as indicated with position indicator PZ. In FIG. 5*c*, the galley module 10 of FIG. 5*a* and FIG. 5*b* is shown with the movable countertop 14 in the extended position P2.

A first arrow A1 indicates the movement from the retracted position P1 towards the extended position P2; and a second arrow A2 indicates the movement from the extended position P2 towards the retracted position P1. A third arrow A3 indicates the movement in either of the two directions.

The term "basic working surface" relates to the part of the working surface that is always present. The basic working surface can also be referred to as base surface, ground surface or permanent working surface.

The term "enlarged working surface" relates to the part of the working surface that is only present when the working surface is extended. The enlarged working surface can also be referred to as increased surface, improved surface or temporarily working surface. The basic working surface is part of the enlarged working surface.

The term "exposed" relates to the portion being usable as countertop, i.e. as working surface for the crew members.

In FIG. 6*a*, the galley module 10 is shown in the context of the aircraft galley 100. An opening radius of one or more doors 32 is indicated. The doors 32 open into the basic working surface 28, when the movable countertop 14 is in the retracted position P1 (see FIG. 6*a*). When the movable countertop 14 is in the extended position P2 (see FIG. 6*c*), the doors 32 also open into the working surface, but a part of the working surface is unaffected by the opening doors 32.

According to an option, an extension ratio of the enlarged working surface 30 in relation to the basic working surface 28 of approximately 2:1 is provided.

In other words, the basic surface part in relation to the additionally provided extra surface part is provided with a so-called base-to-additional-part ratio of at least 1:1. This can also be referred to as increase ratio.

However, lower or higher ratios are also possible.

In a first option, lower ratios are provided in further examples, such as an extension ratio of 1.5:1 or 1.75:1, i.e. an increase ratio of 1:1.05 or 1:0.75.

In a second option, higher ratios are provided in further examples, such as an extension ratio of 2.25:1 or 2.5:1 or 2.75:1 or 3:1, i.e., an increase ratio of 1:1.25 or 1:1.5 or 1:1.75 or 1:2.

It is noted that higher ratios for the extendable part must still consider accessibility and space issues within the galley, e.g., access to an E-panel often arranged in an upper part of the gally and also the reach of standard units as well as the requirements for sufficient and save moving space.

The term "approximately" comprises a deviation of +/−25%, e.g. a deviation of +/−10% or a deviation of +/−5%.

FIG. 6a-6c show the galley of FIG. 4 with different positions of the sliding work deck.

The term "extension ratio" relates to a ratio of the surface area, or surface depth of the working surface, in the extended position versus the retracted position. A ratio of 2:1 means that the extended position provides a total working surface (in sum) that is twice as large as in the retracted position.

For example, a depth of the extended working surface of the extendable countertop portion in the extended position is twice the depth of the extendable countertop portion in the retracted position.

In an option, the depth of the working surface of the extendable countertop portion in the extended position is such that a user belonging to the so-called 5% Asian female can reach an inside of equipment arranged within the galley support structure 12 behind the countertop portion.

In an example, the extractability of the movable countertop portion is limited such that an oven arranged in the galley support structure 12 can still be reached in both the retracted and the extended position. As an advantage, it is to be ensured that the rear of the oven can be reached, e.g., when there is a fire that needs to be extinguished.

In another example, the extractability of the movable countertop portion is limited such that an electric circuit panel arranged in an upper part of the galley support structure 12 can still be reached. The term "still be reached" relates to be within reach of an average arm length of a standard person, such as a 5% Asian female person.

According to an option, the extendable countertop portion provides a continuous working surface portion in the retracted position P1 as well as in the extended position P2.

The term "continuous working surface portion" relates to a working surface without step, offset or gap or other interruption.

The extendable countertop portion is a single-piece working surface, also referred to as one-piece worktop. The extendable countertop portion is pulled out as a whole portion, i.e., the part being exposed as a basic working surface is continuously moved forward in a so-called distal direction, while the portion being non-exposed in the retracted position is gradually becoming exposed.

According to an option, as indicated in FIG. 3, the galley support structure 12 comprises an upper part 34 with a plurality of upper storage compartments 36 and a lower part 38 with a plurality of lower storage compartments 40. The galley support structure 12 provides a horizontal compartment 42 for receiving a non-exposed part of the extendable countertop portion in the retracted position P1.

The horizontal compartment 42 can be provided in a middle part 44, between the upper part 34 and the lower part 38.

The term "upper part" relates to the part of the gally structure above the working surface.

The term "upper storage compartments" relates to compartments in the upper part for storing or accommodating containers, equipment or the like.

The term "lower part" relates to the part of the gally structure below the working surface.

The term "lower storage compartments" relates to compartments in the lower part for storing or accommodating containers, equipment or the like.

The term "horizontal compartment" relates to a sort of horizontal slot that is configured to receive a part of the movable countertop.

In an example, a part of the upper storage compartments is configured to receive standard units and a part of the lower storage compartments is configured to receive half-size and/or full-size standard trolleys. The trolleys can also be referred to as aircraft trolleys or onboard trolleys.

According to an option, the extendable countertop portion is having a continuous width of at least one of the group of:
   i) at least two upper storage compartments; and
   ii) at least two lower storage compartments.

The continuous width is indicated with a first span indicator 46 in FIG. 3 for a complete width of the galley. In FIG. 4, a further span indicator 48-1 indicates the width of e.g. two trolleys. A still further span indicator 48-2 indicates a further width of for example two trolleys.

The term "continuous width" relates to a non-interrupted width of the countertop portion, e.g., without a gap or groove.

In an option, the extendable countertop portion essentially spans across half of the width of the galley module 10. For example, two countertop portions are provided next to each other. At least one of the countertop portions is movable. In an example, one of the countertop portions is movable and the other is fixed. In another example, both of the countertop portions are movable.

In an option, the two movable countertop portions are movable independently.

In another option, the two movable countertop portions are movable in a dependent manner.

In an option, the extendable countertop portion essentially spans across the complete width of the galley module 10, i.e., from one lateral sidewall top the other lateral sidewall.

In an option, the extendable countertop portion essentially spans across the width of two trolleys. In an example, the extendable countertop portion essentially spans across the width of three or four trolleys.

In an option, the horizontal compartment is having a width of at least one of the group of: i) at least two upper storage compartments, and ii) at least two lower storage compartments.

According to an option, the extendable countertop portion comprises a plate structure 50 mounted on at least two sliding rails 52.

In FIG. 7a, the countertop 14 is shown in its retracted position P1; FIG. 7b shows the example of FIG. 7a with the countertop 14 in its extended position P2. In FIG. 7a, an example of an extendable countertop is shown spanning across the width of the galley.

The term "plate structure" relates to a flat part of the countertop provided like a plate, providing a smooth surface as well as stability.

The term "sliding rails" relates to longitudinal elements that are movable in relation to at least one of the support structure and the countertop and that are allowing a sliding motion of the countertop portion in relation to the galley support structure 12.

For example, the sliding rails comprise a lower rail portion that comprise sleds mounted to the galley support structure 12 and an upper rail portion mounted to the plate structure. Roller bearings can be provided as part of the sleds being attached to the galley support structure 12, e.g., the galley horizontal plate.

In an example, the lower rail portion is resting on a part of the galley support structure 12; the plate structure is resting on the upper rail portion. A bearing arrangement, e.g., roller bearings, is arranged between the lower and the upper rail portion. In an option, an intermediate rail portion is arranged between the lower and the upper rail portion. A lower bearing arrangement is arranged between the lower rail portion and the intermediate rail portion; further, an upper bearing arrangement is arranged between the intermediate rail portion and the upper rail portion.

In an option, the plate structure comprises a sandwich structure with a core between an upper and a lower layer. Load distributing profiles are inserted for receiving an upper part of the sliding rails.

According to an option, as indicated in FIG. 7*a* and FIG. 7*b*, at least one extendable countertop portion comprises a drainage section 54 that comprises a drainage grill 56 as an upper resting surface and a liquid collecting arrangement 58 below the drainage grill 56. Further, a liquid drainage function of the drainage section is provided at least for the retracted position P1 and the extended position P2.

The term "drainage section" relates to a part or the countertop being suitable for draining off liquids, such as spilled beverages or residuals in used cups or glasses.

The term "drainage grill" relates to a surface with a plurality of openings to provide flow or discharge openings. The drainage grill can be provided with a plurality of round or square holes or as a grid or grill structure.

The term "liquid collecting arrangement" relates to a sort of basin underneath the drainage grill that is provided top collect the liquid passing through the drainage grill.

The term "liquid drainage function" relates to the function of the sink portion allowing the discharge or draining of liquids.

According to an option, as indicated in FIG. 7*a* and FIG. 7*b*, the liquid collecting arrangement comprises an inclined liquid collecting trough 60 below the drainage grill. The liquid collecting trough 60 has a lower discharge outlet 62 (see also FIG. 15*a* ff). A collecting trench 64 is arranged below the lower discharge outlet to receive the discharged liquid. The collecting trench is configured to be connected to an aircraft wastewater duct arrangement to transfer the discharged liquid to the aircraft wastewater duct arrangement.

As an option, the collecting trench spans in a moving direction of the movable countertop such that the lower discharge outlet is permanently arranged above the collecting trench.

The term "inclined liquid collecting trough" relates to an open receptacle for collecting the liquid provided by the collecting trench. The trough is a sort of basin.

The term "lower discharge outlet" relates to an outlet of the trough through which outlet the liquid can drain off.

The term "collecting trench" relates to a longitudinal basin for receiving the liquid and discharging the liquid.

The drainage grill and the liquid collecting trough are provided by the movable extendable countertop portion; as an option, the collecting trench is provided fixed to the galley support structure 12.

In an example, the aircraft wastewater duct arrangement comprises a wastewater reservoir or tank.

In another example, the aircraft wastewater duct arrangement comprises a wastewater outlet near a rear end of the aircraft to discharge waste liquids.

In FIG. 7, also a plurality of latches for trolleys or other parts to be accommodated in the lower compartments are shown below the countertop. As an example, a pair of a pivotable longer latch 63 and a pivotable shorter latch 95 is provided for each compartment. The shorter latch 65 allows to hold the trolley in the compartment. The longer latch 63 can also hold the trolley, but it can also ensure that the door of the trolley maintains in the closed state. For opening, but still holding the trolley, the shorter latch maintains in a vertical latching orientation, while the longer latch can be pivoted from a vertical orientation to a horizontal orientation, releasing the door, which can then be opened when the door lock is released.

It is noted that the latches 63, 65 are mounted to a fixed part of the galley's support structure 12.

In FIG. 8, a perspective view of the example of FIG. 7*b* is shown in another viewing direction, with partly not shown parts for better illustrating a liquid collecting arrangement providing a sink-like function. The movable plate 50 is not shown, but the plurality of the rails 52 underneath. Further, a horizontal panel 66 e.g. belonging to the galley support structure 12, is indicated.

FIG. 8 shows the arrangement of the sink under the movable work deck in detail. In an option, it is usable for drainage for all positions of the sliding workdeck. The sink is arranged under the area of the drainage grill and connected to water waste duct and water waste container/tank.

In FIG. 9*a*, another perspective view of the extendable countertop 14 is shown in its retracted position P1. FIG. 9*b* shows the example of FIG. 9*a* with the countertop 14 in its extended position P2. The liquid collecting trough 60 with its lower discharge outlet 62 moves together with the upper plate, but the collecting trench 64 remains fixed.

FIG. 9*a* and FIG. 9*b* show schematic drawings of an exemplary embodiment of a countertop of a galley as an example. Four sliding rails allow the moving countertop to easily slide under the galley equipment. The drainage grill is integrated in the movable workdeck. The size is adapted to the distance of the sliding rails and the depth of the countertop/workdeck. FIG. 9*a* shows the normal position, i.e., retracted position. FIG. 9*b* shows the expanded state, i.e., pull-out position.

FIG. 9*a* and FIG. 9*b* show the mechanism of the sliding countertop. Four sliding rails allow the moving countertop to easily slide under the galley equipment. The drainage grill is integrated in the movable part of the workdeck.

In FIG. 10*a*, another perspective front view of the example of FIG. 1*a* is shown with the extendable countertop 14 in its retracted position P1. FIG. 10*b* shows the example of FIG. 10*a* with the countertop 14 in its extended position P2.

In FIG. 11, a further perspective view of an example of a galley module is shown with an extendable countertop and an integrated liquid collecting arrangement.

FIG. 11 shows a housing structure of an aircraft galley.

In FIG. 12*a*, a further example of a galley module is shown with an extendable countertop that is provided as two separate portions, a left portion 68 and a right portion 70. The left portion 68 and the right portion 70 both provide an extendable working surface portion; the right is also equipped with an example of the integrated liquid collecting arrangement 56. The countertop is shown in its retracted position P1 in FIG. 12*a* for both the left portion 68 and the right portion 70. FIG. 12*b* shows the example of FIG. 12*a* with the countertop in its extended position P2.

As an example for the stored containers or installed equipment, FIG. 12*a* and FIG. 12*b* show a first oven 72 and a second oven 74 above or behind the left portion 68.

Further, a coffee maker arrangement 76 is shown above the right portion 70. Still further, also a beverage dispensing unit 78 is provided above the right portion 70.

In FIG. 13, a further perspective view of the left part of FIG. 12 is shown without the left portion 68 of the movable countertop. A plate 80 of the galley structure can be seen with rails mounted thereon. The right portion 70 is shown on the right side.

According to an option, as shown in FIG. 14*a* and FIG. 14*b*, the drainage section is arranged in one lateral part of the countertop portion. A movable tray 82 is provided in an opposite lateral part of the countertop portion for providing a bridging water collector draining into the drainage section.

FIG. 14*a* shows the tray in an upright manner, i.e. in a parking or storage position. FIG. 14*b* shows the tray pivoted downwards to the horizontal, i.e. in a collecting or use position.

The term "movable tray" relates to a portion that serves as collecting tray for guiding liquid to the drainage section. The movable tray provides an extension of the drainage section.

For example, the movable tray is foldable downwards from a stored position into a liquid draining position.

In an option, the countertop comprises two extendable countertop portions, and a covering strip 84 is provided between adjacent lateral edges of the extendable countertop portions.

In a further option, the two extendable countertop portions have protruding lateral edge portions along adjacent lateral edges of the extendable countertop portions in the extending parts.

In FIG. 15*a*, a perspective cross-section through the integrated liquid collecting arrangement is shown when the countertop is in its retracted position. FIG. 15*b* shows the countertop is in its extended position.

As mentioned above in relation with FIG. 7*a* and FIG. 7*b*, the liquid collecting arrangement comprises the inclined liquid collecting trough 60 below the drainage grill. The liquid collecting trough 60 has the lower discharge outlet 62. the collecting trench 64 is arranged below the lower discharge outlet to receive the discharged liquid.

In FIG. 15*a*, the inclined liquid collecting trough 60 discharges into a further trough 86 beneath it, which further trough 86 has the lower discharge outlet 62 at the lateral side. The inclined liquid collecting trough 60 moves together with the movable countertop portion; the further trough 86 is fixed to the supporting structure of the galley.

As an option, a spilling edge 88 is provided at the movable countertop.

In FIG. 16*a*, a cross-section through the integrated liquid collecting arrangement is shown when the countertop is in its retracted position P1. FIG. 16*b* shows the countertop is in its extended position P2.

In FIG. 17, the spilling edge 88 as a detail of the countertop is shown in a perspective view.

According to an option, also shown in FIG. 17, at least one latching system 90 is provided configured to temporarily fix the extendable countertop portion in at least the retracted position and the extended position.

The latching system 90 can also be referred to as latch.

In an option, the latching system 90 is a lateral latching system in a lateral position in relation to the extendable countertop.

In an example, the latching system concept comprises at least one electro-mechanical latch, e.g., mechanical latches, actuated electronically, operated remotely.

In an example, a lateral latch 92 is provided.

The term "lateral latch" relates to a mechanism provided for temporarily securing the countertop, i.e., for releasably blocking the movement of the countertop. The latch 92 is arranged to a side of the countertop.

In an option, the at least one lateral latch 92 is further configured to provide a plurality of further fixable positions for the extendable countertop portion. The further fixable positions are arranged between the retracted position and the extended position.

In an example, the latch is arranged in an integrated manner in a vertical lateral wall segment of the galley support structure 12 next to the extendable countertop portion. The latch comprises at least one handle portion for manual interaction and at least one pin movable by acting on the handle portion.

In another example, the latch is mounted on the vertical lateral wall segment of the galley support structure 12 next to the extendable countertop portion.

In an option, the lateral latch is provided as a double latch arrangement comprising a first and a second latch with a first handle portion 94 acting on a first pin, and a second handle portion 96 acting on a second pin. In an option, the first handle portion and the second handle portion act on the same pin.

In a further option, a center latch is provided that is mounted to the galley support structure 12. In an example, the center latch is arranged above the extendable countertop portion such that a latch pin can engage with a respective receptacle of the extendable countertop portion from above. In another example, the center latch is arranged below the extendable countertop portion on a front side of the galley support structure 12 such that a latch pin can engage with a respective receptacle of the extendable countertop portion from below.

In FIG. 18, a perspective view of the area below the movable plate is shown. Besides rails, also a barrier arrangement 91 below the upper plate of the movable countertop (not shown) is provided. The barrier 91 is located behind the moveable countertop to prevent dirt and moisture ingress into the galley structure.

In FIG. 19, another example of the double latch for releasably holding the countertop 14 is shown. As indicated in relation with FIG. 17, the double latch arrangement has the first and second latches with the first and second handle portions 94, 96.

As an option, FIG. 19 shows an elevated edge 98, e.g. acting as the spilling edge 68, also for the countertop portion that does not have an integrated sink function.

In FIG. 20, an example of a removable stop 97 for the countertop is shown as a further option. The removable stop 97 is provided at the galley support structure 12 to limit a movement of the extendable countertop portion(s).

For example, the removable stop 97 is attached with a screw 95 that can be loosened to remove the stop. The stop may be arranged between two adjacent movable countertop portions, i.e., between a right and a left portion, and can act as stop for both portions by providing two lateral abutting protrusions 93. In an option, the removable stop 97 is provided for only one movable portion and is thus provided with only one abutting protrusion. For a stopping engagement of the movable countertop portion, a respective abutting part is provided at the rear side or read edge of the movable countertop portion.

The term "removable stop" relates to a part that blocks the further movement of the countertop portion once the extended or maximum position is reached.

As an example, the removable stop is arranged separately in a middle portion of the extending worktop surface.

In an example, the removable stop is integrated in the lateral latch.

In an example, the removable stop is integrated in the center latch.

In an option, the removable stop is mounted to the galley support structure 12 by a removable fixation element. For example, the fixation element is a screw, a bolt, or a pin with a fixation ball. For example, the fixation element is a bracket or ring securing a stop latch to a bolt or stem.

In another option, the removable stop is mounted to the galley support structure 12 by a quick release connection such that the removable stop can be released by a manual turn of the removable stop.

The removable stop allows to easily de-mount the countertop even during flight operation. For example, in case of a blocked or otherwise malfunctioning sliding moving mechanism while the countertop is in the extended position, the crew can demount the countertop and temporarily store the countertop such that required space along the cabin remains non-obstructed.

In FIG. 21, a perspective view of the example of FIG. 13 is shown with the right countertop in its retracted position and the left countertop in a released or demounted state when a stop, such as the removable stop as shown in FIG. 20, has been removed.

In FIG. 22, an example of an aircraft 200 is shown. The aircraft 200 comprises a fuselage structure 202 and a cabin space 204 accommodated inside the fuselage structure 202. The cabin space 204 comprises at least one example of the galley module 10 according to one of the examples above or at least one example of the aircraft galley 100 according to one of the examples above.

The term "fuselage structure" relates to a structure of the aircraft enclosing or accommodating space that is used for the cabin for transporting passengers, and also for the cargo area for transporting goods.

The term "cabin space" relates to a part of the space inside the fuselage that is provided for the transport of passengers.

The cabin may also comprise at least one lavatory module and a plurality of passenger seating devices. The cabin may further comprise crew rest facilities, overhead stowage bins and crew seats.

In FIG. 23, basic steps of an example of a method 300 for operating a galley onboard an aircraft are shown. The method 300 comprises the following steps:

In a first step 302, a galley module with a galley support structure is provided comprising a plurality of storage compartments and with a countertop arranged above lower storage compartments and below upper storage compartments. The countertop is provided as permanent working surface for onboard services. In an option, the galley module is provided according to one of the examples above.

In a second step 304, at least one extendable countertop portion of the countertop is moved from a retracted position to an extended position or vice versa.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an", or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A galley module for an aircraft, the galley module comprising:

a galley support structure providing a plurality of storage compartments, the gallery support structure having a first wall configured to delimit an aisle of the aircraft and a second wall; and a countertop arranged above lower storage compartments and below upper storage compartments;

wherein the countertop is provided as a permanent working surface for onboard services; and wherein at least one portion of the countertop is an extendable countertop portion that is movable between a retracted position and an extended position, wherein the extendable countertop portion is positioned laterally between the first wall and the second wall and has a lateral edge that extends up to the first wall, wherein the extendable countertop portion comprises a drainage section that comprises a liquid collecting arrangement, wherein the liquid collecting arrangement is configured to be connected to an aircraft waste water duct arrangement to transfer a discharged liquid to the aircraft waste water duct arrangement, and wherein a liquid drainage function of the drainage section is provided at least for the retracted position and the extended position.

2. The galley module according to claim 1, wherein in the retracted position, a part of the extendable countertop portion is exposed as a basic working surface, and in the extended position, the complete extendable countertop portion is exposed as an enlarged working surface.

3. The galley module according to claim 1, wherein an extension ratio of an enlarged working surface in relation to a basic working surface of approximately 2:1 is provided.

4. The galley module according to claim 1, wherein the extendable countertop portion provides a continuous working surface portion in the retracted position as well as in the extended position.

5. The galley module according to claim 1, wherein the galley support structure comprises an upper part comprising the upper storage compartments and a lower part comprising the lower storage compartments; and wherein the galley support structure provides a horizontal compartment for receiving a non-exposed part of the extendable countertop portion in the retracted position.

6. The galley module according to claim 1, wherein the extendable countertop portion has a continuous width of at least one of the group of:

i) at least two upper storage compartments; and ii) at least two lower storage compartments.

7. The galley module according to claim 1, wherein the extendable countertop portion comprises a plate structure mounted on at least two sliding rails.

8. The galley module according to claim 1, wherein at least one latching system is provided configured to temporarily fix the extendable countertop portion in at least the retracted position and the extended position.

9. The galley module according to claim 1, wherein a removable stop is provided at the galley support structure to limit a movement of the extendable countertop portion.

10. The galley module according to claim 1, wherein the drainage section comprises a drainage grill as an upper resting surface and the liquid collecting arrangement is located below the drainage grill.

11. An aircraft comprising:

a fuselage structure; and a cabin space accommodated inside the fuselage structure;

wherein the cabin space comprises at least one galley module according to claim 1.

12. An aircraft galley for a passenger airplane, the galley comprising:

a galley module according to claim 1; and a plurality of trolleys and standard units storable in the storage compartments;

wherein during at least one of the group of loading operation, on-board service operation during flight and unloading operation, the extendable countertop portion is movable into the extended position.

13. An aircraft comprising:

a fuselage structure; and a cabin space accommodated inside the fuselage structure;

wherein the cabin space comprises at least one galley module according to claim 12.

14. The galley module according to claim 1, wherein the extendable countertop portion has an opposing lateral edge to the lateral edge, wherein the opposing lateral edge is spaced from the second wall.

15. The galley module according to claim 14, wherein the second wall is a rounded wall configured to fit snuggly fit against an inner side of a fuselage enclosing a cabin space in the aircraft.

16. A galley module for an aircraft, the galley module comprising:

a galley support structure providing a plurality of storage compartments; and a countertop arranged above lower storage compartments and below upper storage compartments;

wherein the countertop is provided as a permanent working surface for onboard services;

wherein at least one portion of the countertop is an extendable countertop portion that is movable between a retracted position and an extended position;

wherein the extendable countertop portion comprises a drainage section that comprises a drainage grill as an upper resting surface and a liquid collecting arrangement below the drainage grill;

wherein a liquid drainage function of the drainage section is provided at least for the retracted position and the extended position;

wherein the liquid collecting arrangement comprises an inclined liquid collecting trough below the drainage grill;

wherein the liquid collecting trough has a lower discharge outlet;

wherein a collecting trench is arranged below the lower discharge outlet to receive a discharged liquid;

wherein the collecting trench is configured to be connected to an aircraft waste water duct arrangement to transfer the discharged liquid to the aircraft waste water duct arrangement; and wherein the collecting trench spans in a moving direction of the movable countertop such that the lower discharge outlet is permanently arranged above the collecting trench.

17. A galley module for an aircraft, the galley module comprising:

a galley support structure providing a plurality of storage compartments; and a countertop arranged above lower storage compartments and below upper storage compartments;

wherein the countertop is provided as a permanent working surface for onboard services;

wherein at least one portion of the countertop is an extendable countertop portion that is movable between a retracted position and an extended position;

wherein the extendable countertop portion comprises a drainage section that comprises a drainage grill as an upper resting surface and a liquid collecting arrangement below the drainage grill;

wherein a liquid drainage function of the drainage section is provided at least for the retracted position and the extended position;

wherein the drainage section is arranged in one lateral part of the countertop portion; and wherein a movable tray is provided in an opposite lateral part of the countertop portion for providing a bridging water collector draining into the drainage section.

18. A method for operating a galley onboard an aircraft, comprising the following steps:

providing a galley module with galley support structure comprising a plurality of storage compartments, the gallery support structure having a first wall configured to delimit an aisle of the aircraft and a second wall; and with a countertop arranged above lower storage compartments and below upper storage compartments;

wherein the countertop is provided as a permanent working surface for onboard services; and moving at least one extendable countertop portion of the countertop from a retracted position to an extended position or vice versa, wherein the extendable countertop portion is positioned laterally between the first wall and the second wall and has a lateral edge that extends up to the first wall, wherein the at least one extendable countertop portion comprises a drainage section that comprises a liquid collecting arrangement, wherein the liquid collecting arrangement is configured to be connected to an aircraft waste water duct arrangement to transfer a discharged liquid to the aircraft waste water duct arrangement, and wherein a liquid drainage function of the drainage section is provided at least for the retracted position and the extended position.

\* \* \* \* \*